US006243397B1

(12) United States Patent
Yun

(10) Patent No.: US 6,243,397 B1
(45) Date of Patent: Jun. 5, 2001

(54) MULTI-CARRIER PC-CDMA SYSTEM

(75) Inventor: Sang Boh Yun, Sungnam-si (KR)

(73) Assignee: Mercury Corporation, Incheon (KR)

( * ) Notice: Subject to any disclaimer, the term of this patent is extended or adjusted under 35 U.S.C. 154(b) by 0 days.

(21) Appl. No.: 09/057,703

(22) Filed: Apr. 9, 1998

(30) Foreign Application Priority Data

Apr. 9, 1997 (KR) .................................. 97-13078
Dec. 27, 1997 (KR) .................................. 97-77015

(51) Int. Cl.$^7$ ........................................ H04J 1/00
(52) U.S. Cl. .................. 370/480; 370/465; 370/476; 370/477; 370/478; 370/479; 370/498; 370/342
(58) Field of Search ........................... 370/479, 480, 370/206, 342, 330, 335, 209, 203, 201, 481, 482, 484, 492, 497, 498, 465, 474, 476, 477, 478; 332/100; 375/200

(56) References Cited

U.S. PATENT DOCUMENTS

| | | | |
|---|---|---|---|
| 5,602,833 | * | 2/1997 | Zehavi .................................. 370/209 |
| 5,694,395 | * | 12/1997 | Myer et al. .......................... 370/480 |
| 5,694,396 | * | 12/1997 | Firouzbakht et al. ............... 370/480 |
| 5,751,761 | * | 5/1998 | Gilhousen ............................ 375/200 |
| 5,956,345 | * | 9/1999 | Allpress et al. ...................... 370/480 |
| 6,084,890 | * | 7/2000 | Anderson ............................. 370/480 |

* cited by examiner

Primary Examiner—Dang Ton
Assistant Examiner—Anthony Ton
(74) Attorney, Agent, or Firm—Lilling & Lilling P.C.

(57) ABSTRACT

The present invention relates to a parallel combinatory CDMA (PC-CDMA) system that transmits and receives data by applying a predetermined pseudo number (PN) code corresponding to a plurality of bits, and more particularly relates to a multi-carrier PC-CDMA system, enhancing its efficiency by mixing the PN codes corresponding to the plurality of bits with respective orthogonal frequencies. The transmitting part includes a plurality of mixers $33_1$ to $33_n$ for mixing respective PN codes outputted from a plurality of mappers $32_1$ to $32_n$ with frequency signals having an orthogonal feature and a receiving part including a plurality of mixers $41_1$ to $41_n$ for mixing received signals with the same frequency signals mixed at the transmitting part. Accordingly, it is possible to decrease the number of PN codes needed in a PC-CDMA system by correlating the mappers $32_1$ to $32_n$ of the transmitting part and correlator $42_1$ to $42_n$ and data detectors $43_1$ to $43_n$ of the receiving part through the mixers 33 and 41 independently.

4 Claims, 7 Drawing Sheets

(A)

(B)

(A)

(B)

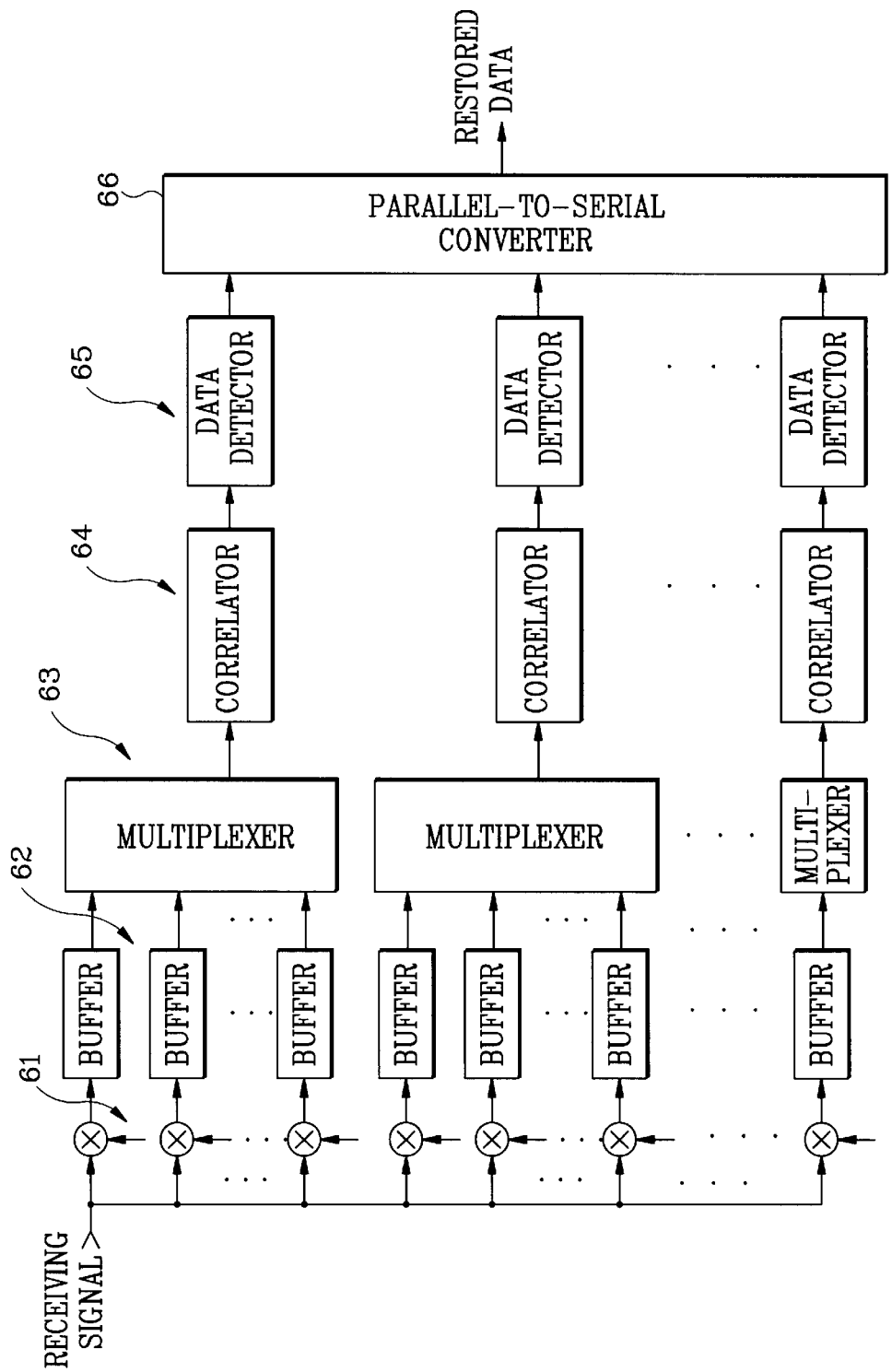

MULTI-CARRIER PC-CDMA SYSTEM

BACKGROUND OF THE INVENTION

1. Field of the Invention

The present invention relates to a parallel combinatory code-division multiple access (PC-CDMA) system that transmits and receives data by applying a predetermined pseudo number (PN) code corresponding to a plurality of bits, and more particularly relates to a multi-carrier PC-CDMA system that enhances its efficiency by mixing the PN codes corresponding to the plurality of bits with respective orthogonal frequencies.

2. Discussion of Related Art

Recently, according as various communication equipments have applied wireless and digital increasingly, communication systems have applied a code-division multiple access (CDMA) gradually, instead of a time-division multiple access (TDMA) or a frequency-division multiple access (FDMA), and more detailedly a direct sequence CDMA (DC-CDMA) and a parallel combinatory CDMA (PC-CDMA) system, etc. have been commonly used. Especially, the PC-CDMA system, which can minimize its complexity and at the same time transmit a great deal of information at high speed, is being watched with keen interest as a mobile communications system such as cellular system.

FIG. 1a and 1b are block diagrams explaining an outline of the PC-CDMA system that transmits and receives, for example, 128-bit data, FIG. 1a shows a transmitting part and FIG. 1b a receiving part. In FIG. 1a, reference numeral 11 denotes a serial-to-parallel converter converting a series of serial data into that of parallel data, reference numerals $12_1$ to $12_{32}$ denote mappers receiving predetermined bits (for example, 4-bit) of data from the serial-to-parallel converter 11 and outputting PN codes corresponding to the bit values and reference numeral 13 denotes a multiplexer mixing the PN codes from the mappers $12_1$ to $12_{32}$ to output. The PN codes outputted from the multiplexer 13 are digital-modulated by means of phase shift keying (PSK) or quadrature PSK (QPSK) and then transmitted through a radio communications network.

In FIG. 1b, reference numerals $21_1$ to $21_{31}$ denote correlators for outputting level signals corresponding to the PN codes of data received and demodulated from the transmitting part. FIG. 2 illustrates a configuration of the correlators $21_1$ to $21_{31}$ of FIG. 1b, comprising a plurality of multiplicators $211_1$ to $211_{16}$ mixing received data with respective intrinsic PN codes [PN(1), PN(2), ..., PN (15) and PN(16)] and a plurality of integrators $212_1$ to $212_{16}$ integrating signals outputted from the multiplicators $211_1$ to $211_{16}$.

In FIG. 1b, reference numerals $22_1$ to $22_{32}$ denote data detectors detecting PN codes, transmitted from the transmitting parts of FIG. 1a, based on the level signals inputted from the correlators $21_1$ to $21_{31}$. Reference numeral 23 denotes a parallel-to-serial convertor converting parallel data from the data detectors $22_1$ to $22_{32}$ into serial data.

The mappers $12_1$ to $12_{32}$ of the transmitting part output PN codes corresponding to 4-bit data values inputted, the PN codes from the mappers $12_1$ to $12_{32}$ are mixed by multiplexer 13 and digital-modulated to be transmitted. Here, as the mappers $12_1$ to $12_{32}$ output respective intrinsic PN codes corresponding to the 4-bit data values inputted, all data outputted from the mappers $12_1$ to $12_{32}$ have orthogonal feature.

In the receiving part, each of the correlators $21_1$ to $21_{32}$ mixes received and demodulated data with all the PN codes [PN(1), PN(2), ..., PN(511) and PN(512)] which are to be transmitted from the transmitting part and then integrates respective data to output, and each data detector $22_1$ to $22_{32}$ detects the PN codes of received data, based on 512-signal level outputted from the correlators $21_1$ to $21_{32}$, and restores 128-bit data (respectively 4-bit) to output. Accordingly, in the above configuration, data can be transmitted and received at high speed as 128-bit data are transmitted and received at the same time.

However, the above described PC-CDMA system has the following problems. When transmitting 128-bit data, 512-PN code (16×32) are needed as shown in FIG. 1 as 16-PN code ($2^4$) are needed when transmitting 4-bit data in a conventional PC-CDMA system. At least 256-PN code are needed and even plus (+) PN codes and minus (−) PN codes are applied to decrease the number of PN code. Accordingly, a PN code generator becomes complicated to generate a large number of PN codes, which prevents diminishing the size of cellular system. The above described PC-CDMA system deteriorates data restoration at the receiving part due to the large number of PN codes. That is, when denoting a signal energy transmitted as an Eb and a noise as a No, the data restoration in a CDMA system is expressed as Eb/No in general, here, all the other PN codes except relevant PN codes act as noise signals. Therefore, in a cellular system using the above described PC-CDMA system, when a great deal of users try to make phone calls simultaneously, PN codes transmitted and received from and to the other cellular phones act as noise signals, which increase the whole noise level, thus all the users cannot make phone calls.

Furthermore, in a PC-CDMA system as described above, considering the receiving part needs correlators $21_1$ to $21_{32}$ and data detectors $22_1$ to $22_{32}$ as much as the number of the mappers $12_1$ to $12_{32}$ needed at the transmitting part, it is an obstacle to minimize a portable communications terminal where the PC-CDMA system is applied.

SUMMARY OF THE INVENTION

Accordingly, the present invention is directed to a multi-carrier PC-CDMA system that substantially obviates one or more of the limitations and disadvantages of the related art.

It is an object of the present invention to provide a multi-carrier PC-CDMA system which decreases the number of PN codes needed.

It is a further object of the present invention to provide a multi-carrier PC-CDMA system which transmits and receives data at higher speed than a conventional PC-CDMA system.

Another object of the present invention is to provide a multi-carrier PC-CDMA system which decreases the number of correlators 21 and data detectors 22 needed at a receiving part.

A multi-carrier PC-CDMA system according to a first aspect of the present invention, including a plurality of mappers for converting a plurality of data bits into PN codes corresponding to the data values to spread transmitting data with predetermined PN codes and detecting PN codes from received data to restore the original data, comprises a mixing means for mixing respective PN codes outputted from the plurality of mappers with frequency signals having orthogonal feature at a transmitting part, and a plurality of mixing means for mixing received signals with frequency signals, which are the same with the ones mixed by the mappers of the transmitting part, at a receiving part, through which PN codes are detected from signals outputted, each mapper generating intrinsic PN codes independently to output.

According to a second aspect of the invention, a multi-carrier PC-CDMA system comprises a transmitting apparatus for mixing a plurality of data bits with PN codes corresponding to the data values and mixing the PN codes again with frequency signals having an orthogonal feature, and a receiving apparatus for mixing the received signals with frequency signals having the orthogonal feature again to detect PN codes and restore the original data, the receiving apparatus is comprised of a plurality of storing means for storing PN code data obtained by mixing the above frequency signals, a multiplexer reading the PN code data in turn to output, a correlator outputting level signals corresponding to the PN codes from the multiplexer and a data detector detecting transmitting data based on the level signals outputted from the correlator.

According to a third aspect of the invention, a multi-carrier carrier PC-CDMA system comprises a transmitting apparatus for mixing a plurality of data bits with PN codes corresponding to the data values and mixing the PN codes again with frequency signals having orthogonal feature, and a receiving apparatus for mixing the received signals with frequency signals having the orthogonal feature again to detect PN codes and restorethe original data, the receiving apparatus is comprised of a plurality of storing means for storing PN code data obtained by mixing the above frequency signals, at least more than one multiplexer reading the PN code data in turn to output, at least more than one correlator outputting level signals corresponding to the PN codes from the multiplexer and at least more than one data detector detecting transmitting data based on the level signals outputted from the correlator.

According to the above configuration in accordance with the present invention, as PN codes outputted from mappers are modulated to frequency signals having the orthogonal feature at the transmitting part and the frequency signals are mixed again with the same frequency signals at the receiving part, the mappers at the transmitting part and PN code detectors at the receiving part are set at one to one correspondence with each other. Therefore, the number of PN codes needed at the mappers can be decreased sharply, which simplifies the configuration of the mapper. When applying the same number of PN codes as a conventional method applies, data can be transmitted at higher speed than before, as the number of data being transmitted in parallel is augmented sharply.

Besides, the present invention can restore received data through a fewer number of correlators and data detector than before, since data restoration is performed by inputting respective PN code data received from the transmitting part into the correlator in turn through the multiplexer. Here, since the number of the correlators and data detectors can be decreased sharply, it is possible to simplify the configuration of the receiving apparatus and reduce cost of production. Furthermore, it is possible to prolong the using time of rechargeable battery for a cellular terminal where the above described receiving apparatus is applied, since power consumption of corresponding circuitry is decreased accordingly. It is possible to diminish the size of the cellular system since the above receiving apparatus can be minimized as its configuration is simplified.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the inventiori and are incorporated in and constitute a part of this specification, illustrate embodiments of the invention and together with the description serve to explain the principles of the invention.

In the drawings:

FIG. 6 is a block diagram showing another configuration of the receiving part of the multi-carrier PC-CDMA system according to the present invention.

DETAILED DESCRIPTION OF THE INVENTION

Reference will now be made in detail to the preferred embodiments of the present invention, examples of which dre. illustrated in the accompanying drawings.

Figure 3A:
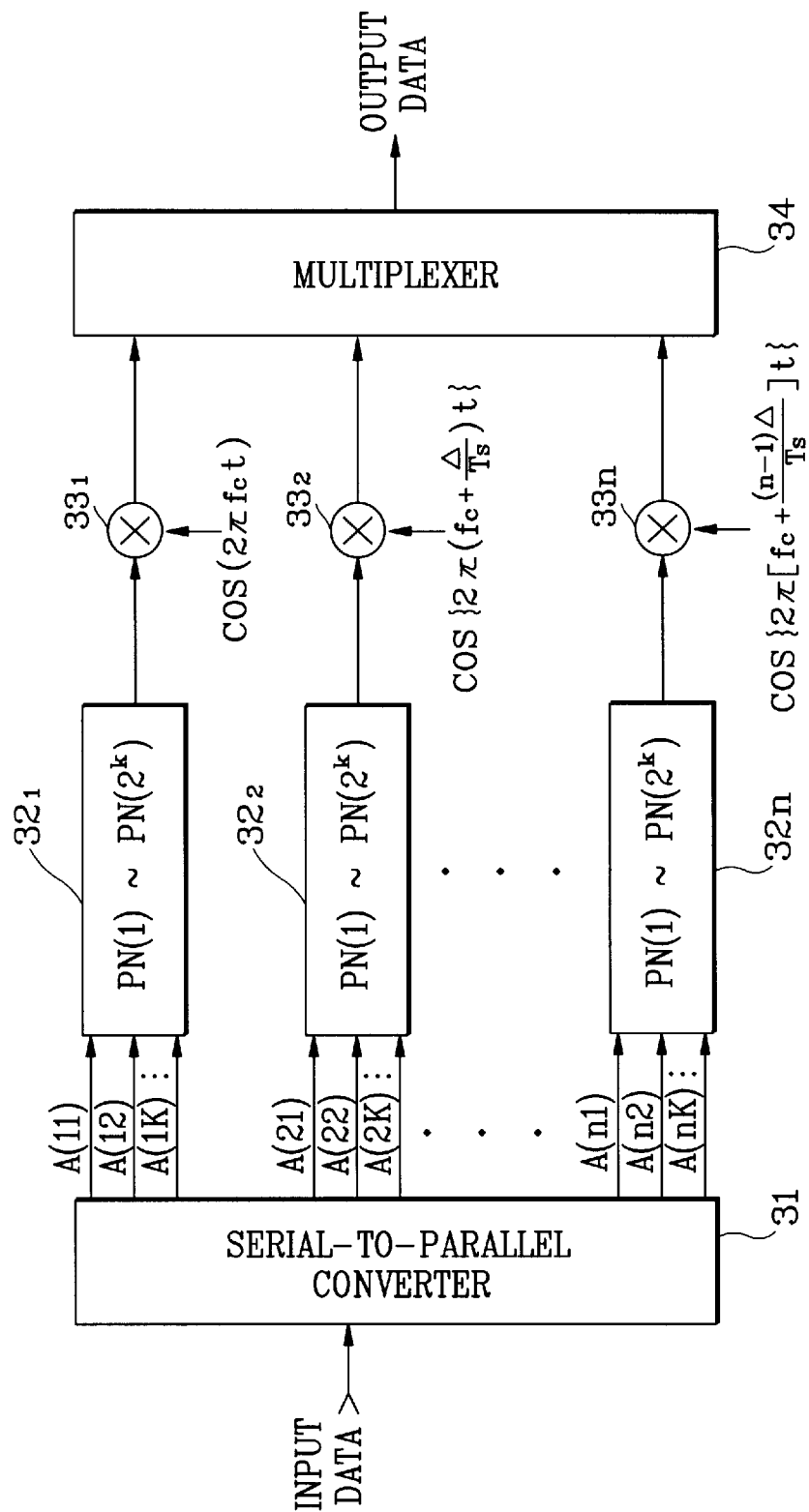
FIG. 3a and 3b are block diagrams of a multi-carrier PC-CDMA system according to an embodiment of the present invention.
Figure 3B:
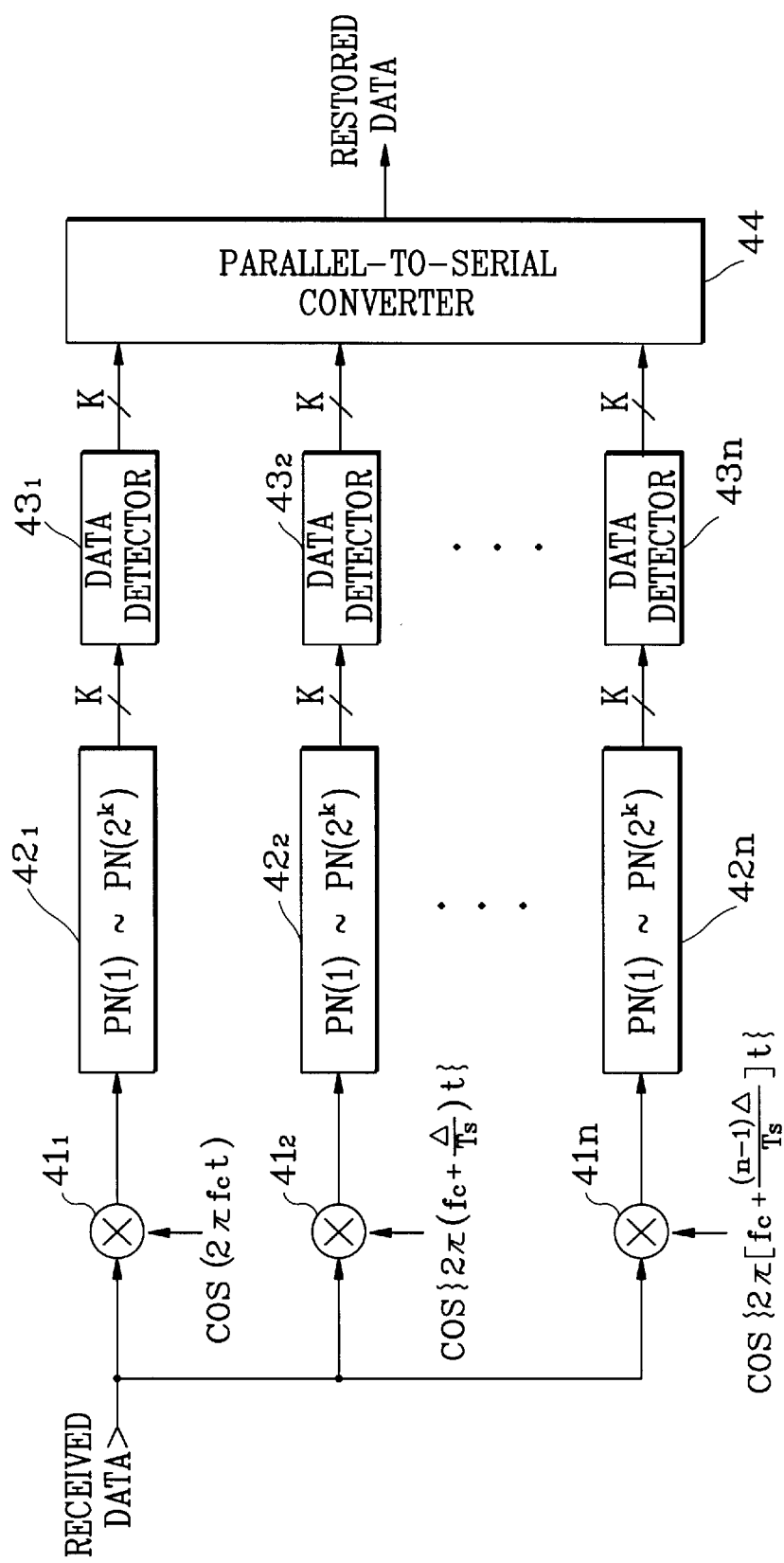

FIG. 3a and 3b are block diagrams of a multi-carrier PC-CDMA CDMA system according to an embodiment of the present invention, FIG. 3a shows a transmitting part and, FIG. 3b shows a receiving part. With reference to these drawings, a preferred embodiment of the present invention is described with a case that n-bit data is being transmitted in parallel and PN code in a unit of k-bit is mixed with the n-bit data to transmit.

In FIG. 3a, reference numeral 31 denotes a serial-to-parallel convertor for converting inputting n-bit serial data into parallel data. Reference numerals $32_1$ to $32_n$ denote mappers inputting the data from the serial-to-parallel convertor in a unit of k-bit to mix with PN codes corresponding to the bit values.

The mappers $32_1$ to $32_n$ output $2^k$ PN codes, when inputting data is k-bit, here, each mapper $32_1$ to $32_n$ outputs all the same PN codes if the values of inputting data are identical with each other. That is, when each data inputting into the mappers $32_1$ through $32_n$ as same value, the PN codes outputted from the mappers $32_1$ to $32_n$ are set to be all identical.

Reference numerals $33_1$ to $33_n$ denote mixers for mixing respective PN codes outnutted from the mappers with orthogonal frequencies, for example, $$\cos(2\pi f_c t),\ \cos\left\{2\pi\left(f_c + \frac{\Delta}{T_s}\right)t\right\}, \ldots, \cos\left\{2\pi\left[f_c + \frac{(n-1)\Delta}{T_s}\right]t\right\}.$$

Reference numeral 34 denotes a multiplexer for mixing the frequency signals ouputted from the mixers 33, the frequency signals outputted from he multiolexer 34 are digital-modulated by means of phase shift keying (PSK) or quadrature PSK (QPSK) and transmitted through a radio communcations network.

In FIG. 3b, reference numerals $41_1$ to $41_n$ denote mixers for mixing the received and demodulated frequency signals with the same frequency signals, respectively, mixed at the transmitting part, that is, $$\cos(2\pi f_c t), \cos\left\{2\pi\left(f_c + \frac{\Delta}{T_s}\right)t\right\}, \ldots, \cos\left\{2\pi\left[f_c + \frac{(n-1)\Delta}{T_s}\right]t\right\}.$$

Figure 1A:
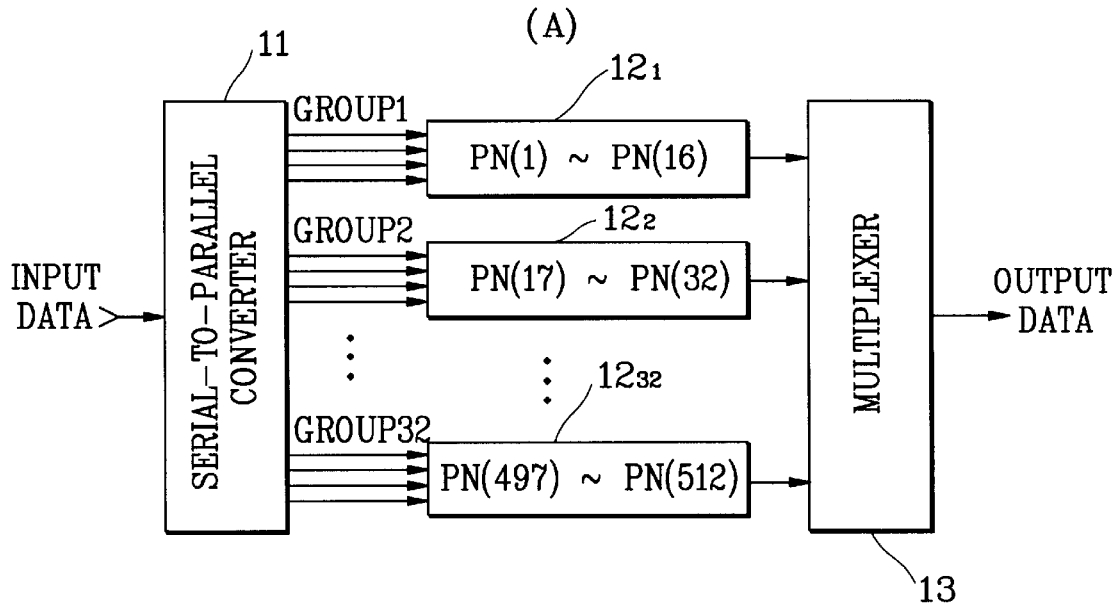
FIG. 1a and 1b are block diagrams of a Prior Art PC-CDMA system.
Figure 1B:
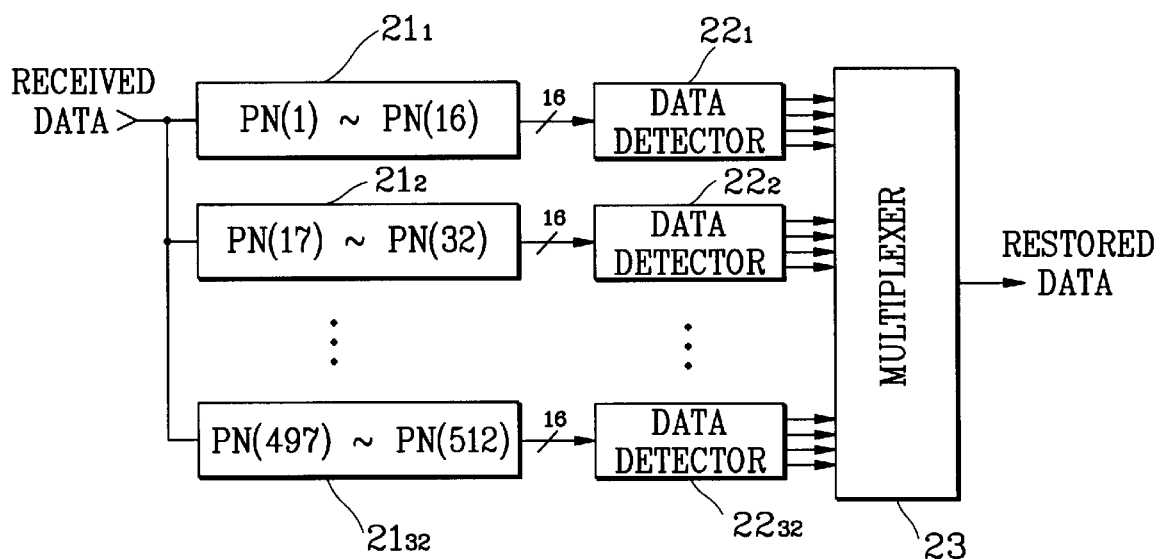

Reference numerals $42_1$ to $42_n$ denote correlators, substantially identical with the correlators 21 described in FIG. 1b, outputting predetermined level signals corresponding to the PN codes inputted after mixing the frequency signals from the mixers 41 with specified PN codes [PN(1), PN(2), ..., PN($2^{k-1}$) and PN($2^k$)] respectively. Reference numerals $43_1$ to $43_n$ denote data detectors detecting PN codes, transmitted from the transmitting parts of FIG. 3a, based on the level signals inputted from the correlators 42, to output k-bit data corresponding to the detected PN codes. Reference numeral 44 denotes a parallel-to-serial convertor converting parallel data from the data detectors into serial data.

In this configuration, each n-bit data outputted from the serial-to-parallel convertor 31 is forwarded in a unit of k-bit to the mappers $32_1$ to $32_n$, the mappers $32_1$ to $32_n$ output PN codes corresponding to the values of data inputted and the mixers $33_1$ to $33_n$ mix the PN codes outputted from the mappers $32_1$ to $32_n$ into frequency signals having orthogonal feature.

Here, a plurality of frequency signals for frequency modulation, that is, $$\cos(2\pi f_c t), \cos\left\{2\pi\left(f_c + \frac{\Delta}{T_s}\right)t\right\}, \ldots, \cos\left\{2\pi\left[f_c + \frac{(n-1)\Delta}{T_s}\right]t\right\}$$

are generated through a Digital Signal Processor (DSP) by using an Inverse Discrete Fourier Transform Algorithm (IDFTA).

Meantime, in the receiving part as shown in FIG. 3b, while the mixers $41_1$ to $41_n$ mix receive data with the same frequency signals mixed at the receiving part, here, the mixers $41_1$ to $41_n$ output the very PN codes which were mixed with the same frequency mixed through the mixers $41_1$ to $41_n$, since the frequency signals have orthogonal feature as described. The the PN codes outputted from the mixers $41_1$ to $41_n$ are restored to the original data through data detectors $43_1$ to $43_n$ and then outputted through the parallel-to-serial convertor 44.

According to the above embodiment in accordance with the present invention, as the PN codes outputted from the mappers $32_1$ to $32_n$ are modulated to frequency signals having orthogonal feature at the transmitting part and the frequency signals are mixed again with the same frequency signals mixed at the receiving part, the mappers $32_1$ to $32_n$ at the transmitting part and the correlators $42_1$ to $42_n$ at the receiving part are set as one to one correspondence with each other. Therefore, the number of PN code needed at the mappers $32_1$ to $32_n$ can be decreased sharply, which simplifies the configuration of PN code generators (not depicted). When applying the same number of PN code as a conventional method applies, data can be transmitted at higher speed than before since the number of data being transmitted in parallel is augmented sharply.

Besides, while the embodiment of the present invention is explained above with a case of using $2^n$ PN code when the number of data bit inputted from the mapper $32_1$, to $32_n$ is n, it is possible to reduce the number of PN codes by setting two kinds of PN codes as plus (+) and minus (-) ones in the present invention.

Further, while the embodiment of the present invention is described above with a case that the respective mappers $32_1$ to $32_n$ output the same PN codes when each data inputted into the respective mappers $32_1$ to $32_n$ is same, the respective mappers $32_1$ to $32_n$ may be constructed to output different PN codes with each other, even each data inputted into the respective mappers $32_1$ to $32_n$ is the same. That is, it is possible to construct the respective mappers $32_1$ to $32_n$ independently of each other by mixing PN codes outputted from the mappers $32_1$ to $32_n$ with orthogonal frequencies.

Meantime, in this configuration, a plurality of correlators $42_1$ to $42_n$ and data detectors $43_1$ to $43_n$ are needed so as to restore the PN codes from the mixers $41_1$ to $41_n$ to the original data. These necessary multiple correlators $42_1$ to $42_n$ and data detectors $43_1$ to $43_n$ prevent minimizing, for example, a portable communications terminal and at the same time increase cost of system production.

Figure 4:
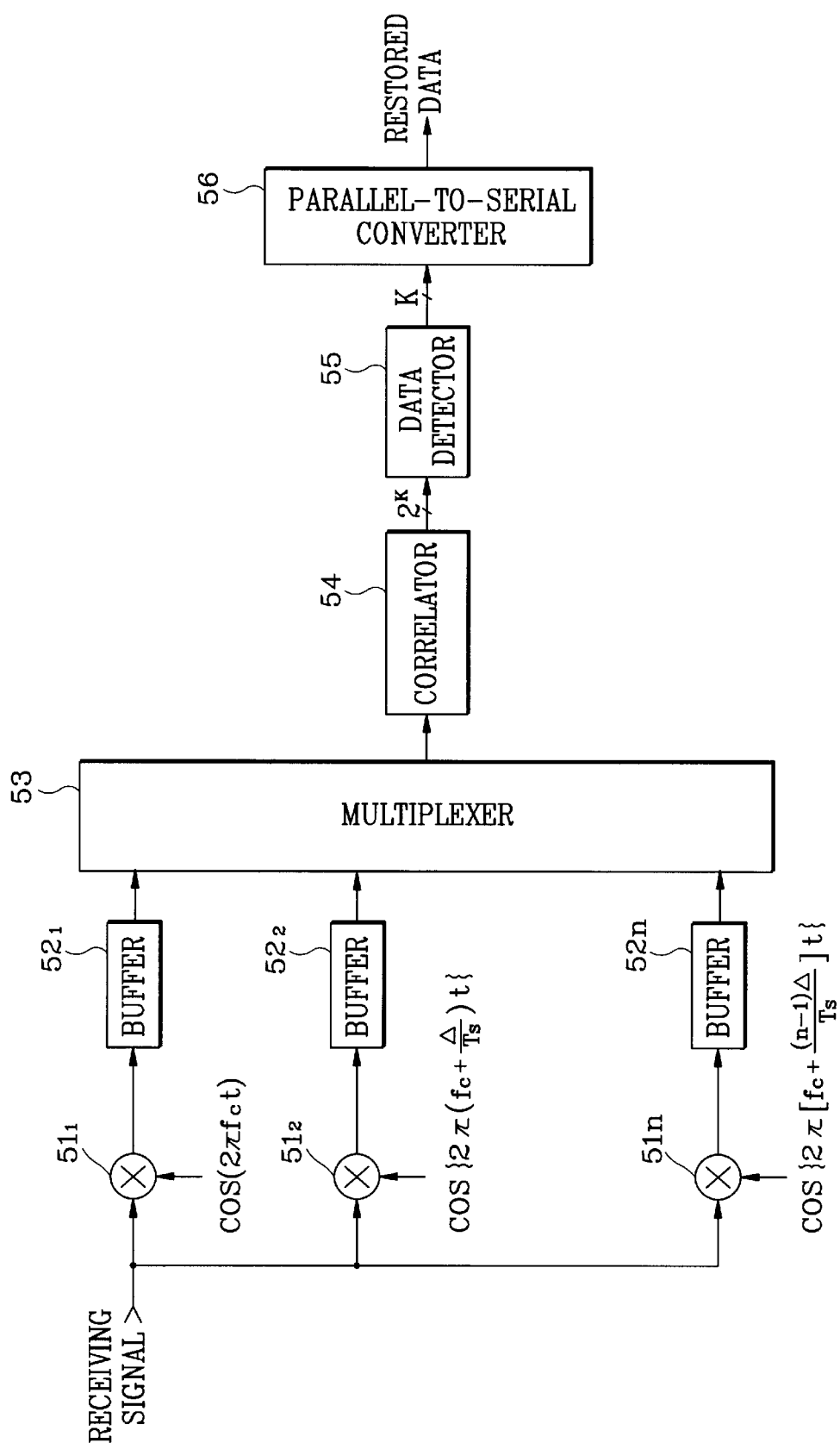
FIG. 4 is a block diagram showing a configuration of the receiving part of a multi-carrier PC-CDMA system according to an embodiment of the present invention.

FIG. 4 is a block diagram showing a configuration of the receiving part of a multi-carrier PC-CDMA system according to an embodiment of the present invention. In FIG. 4, demodulated signals, transmitted from the transmitting parts as shown in FIG. 3b, are inoutted into mixers $51_1$ to $51_n$. Here, the mixers $51_1$ to $51_n$ mix the demodulated frequency signals with the same frequency signals, respectively, with that mixed through the mixers $33_1$ to $33_n$ of the transmitting part in FIG. 3a, that is, $$\cos(2\pi f_c t), \cos\left\{2\pi\left(f_c + \frac{\Delta}{T_s}\right)t\right\}, \ldots, \cos\left\{2\pi\left[f_c + \frac{(n-1)\Delta}{T_s}\right]t\right\}.$$

The data outputted front the mixers $51_1$ to $51_n$ correspond to the PN codes outputted from the mappers $32_1$ to $32_n$, that is, the data inputted into the mixers $33_1$ to $33_n$ in FIG. 3a, since the respective frequency signals mixed through the mixers $51_1$ to $51_n$ have orthogonal feature as described above. Buffers $52_1$ to $52_n$ receive data from the mixers $51_1$ to $51_n$, that is, PN codes and store them turn. Reference numeral 53 denotes a multiplexer reading the data stored in the buffers $52_1$ to $52_n$ in a unit of PN code to output. For example, in case that a PN code, outputted from the mapper $32_1$ to $32_n$ in FIG. 3a, is comprised of 64-chip, the multiplexer 53 reads data from the buffers $52_1$ to $52_n$ in a unit of 64-chip to output. Here, she multiplexer 53 accesses the buffers 52 in order of the buffer $52_1$ to the buffer $52_n$, the output of the multiplexer 53, that is, PN codes, is inputted into a correlator 54, then the correlator 54 mixes a predetermined PN code and integrates to output a predetermined level signal corresponding to the PN code inputted.

Figure 2:
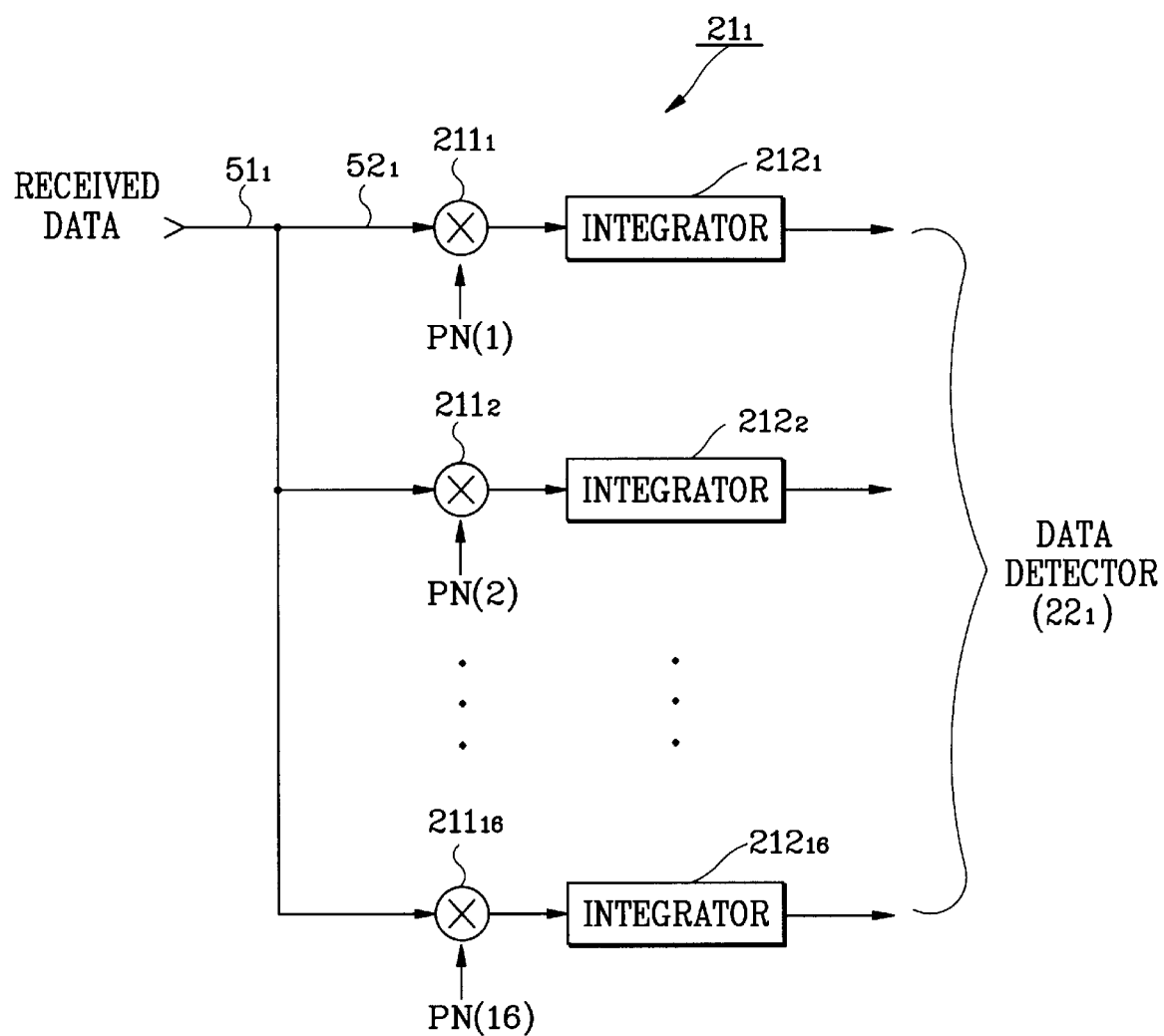
FIG. 2 is a diagram showing a configuration of a Prior Art correlator in FIG. 1b.

The correlator 54 has the same configuration with the correlator 21 shown in FIG. 2.

Figure 5:
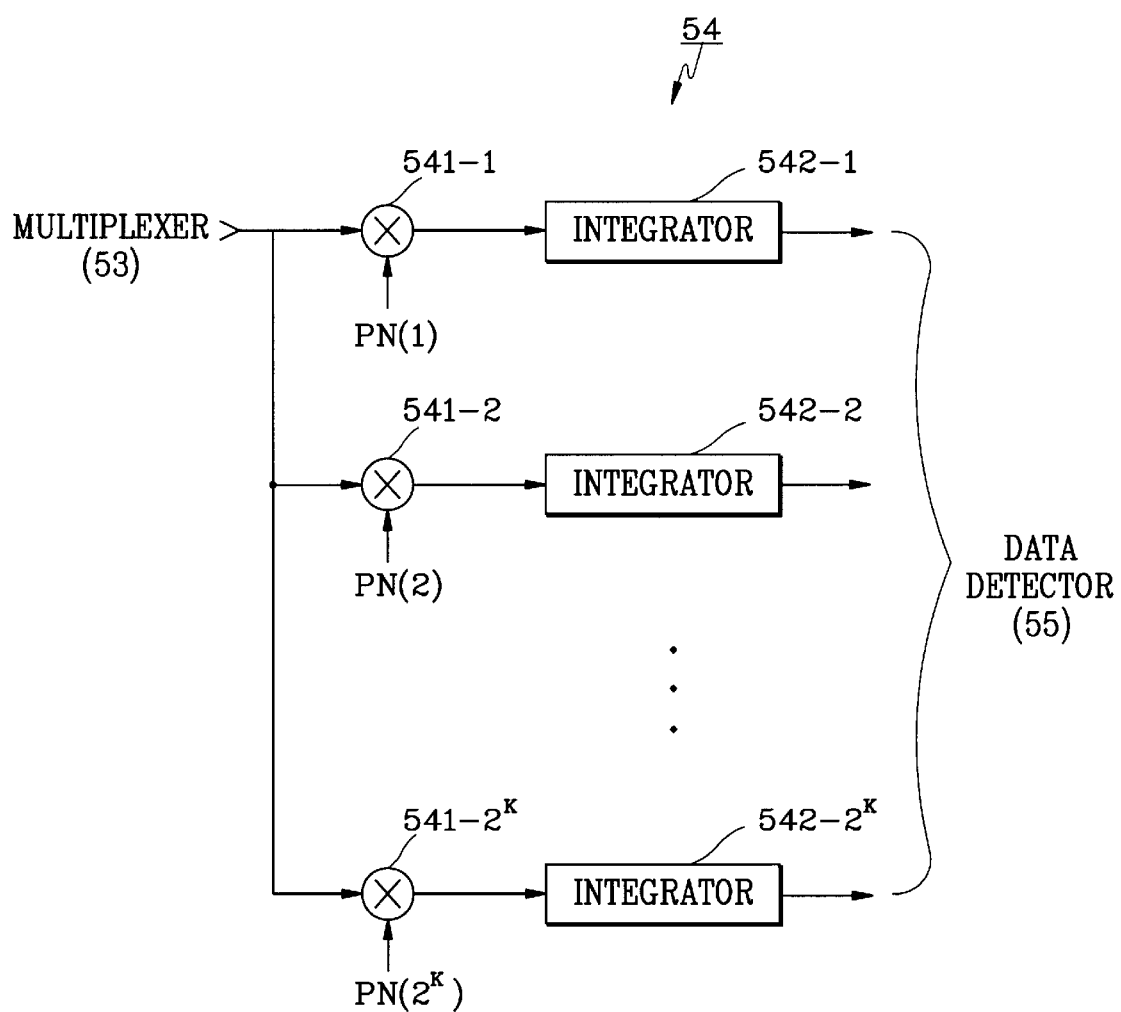
FIG. 5 is a block diagram showing a configuration of a correlator in FIG. 4.

FIG. 5 is a block diagram showing a configuration of the correlator 54 comprising a plurality of multiplicators 541-1 to 541-$2^k$ mixing received data with respective intrinsic PN codes [PN(1), PN(2), ..., PN($2^{k-1}$) and PN($2^k$)] and a plurality of integrators 541-1 to $_{541-2}{}^k$ integrating respective signals outputted from the multiplicators 541-1 to 541-$2^k$. Here, the PN codes [PN(1), PN(2), ..., PN($2^{k-1}$) and PN($2^k$)] mixed through the multiplexers 541-1 to 541-$2^k$ correspond to the PN codes outputted from the mappers $32_1$ to $32_n$ in FIG. 3a.

Meantime, In FIG. 4, reference numeral 55 denotes a data detector detecting the PN codes transmitted from the transmitting parts of FIG. 3a, based on the level signals outputted from the correlators 54, to output k-bit data corresponding to the detected PN codes. Reference numeral 56 denotes a parallel-to-serial convertor converting the parallel data received from the data detector 55 into serial data to output, the data detector 55 and parallel-to-serial convertor 56 have substantially the same configuration with the ones described in FIG. 3b.

In above configuration, the mixers $51_1$ to $51_n$ mix receive signals with predetermined frequency signals, that is, $$\cos(2\pi f_c t), \cos\left\{2\pi\left(f_c + \frac{\Delta}{T_s}\right)t\right\}, \ldots, \cos\left\{2\pi\left[f_c + \frac{(n-1)\Delta}{T_s}\right]t\right\}.$$

Repeatedly, the respective mixers $51_1$ to $51_n$ input the PN codes, outputted from the mappers 32 in FIG. 3a, into the buffers $52_1$ to $52_n$ respectively. Then the multiplexer 53 reads the inputted PN codes through the buffers $52_1$ to $52_n$ in order of the buffer $52_1$ to the buffer $52_n$. The correlator 54 mixes the inputted PN codes with predetermined PN codes [PN(1), PN(2), ..., PN($2^{k-1}$) and PN($2^k$)] and integrates the output data.

As is above described, since the respective PN codes have orthogonal features, when the PN code inputted is mixed with the other PN code, the output is set to "0" ideally, and if the PN code inputted is mixed with the same PN code, the output is set to "1" ideally. Therefore, referring to FIG. 5, supposing the PN code received from the transmitting part is, for example, PN(1), a predetermined level value is outputted from an integrator 542-1 coupled to a multiplexer 541-1 mixing the PN (1), but a level of "0" is outputted from the other integrators 542-2 to $_{542-2}{}^k$. Then the data detector 55 in FIG. 4 detects the PN codes received from the transmitting part, based on the level signals inputted from the correlator 54, and demaps the data inputted from the mappers $32_1$ to $32_n$, based on the output detected. The demapped data is restored to the original data through a parallel-to-serial convertor 66.

In this configuration, only correlator 54 and data detector 55 can restore the received data differently than before, since the PN codes inputted through the mixers $51_1$ to $51_n$ are restored to the original.data through the buffers $52_1$ to $52_n$ and the multiplexer 53 in turn. Thus, it is possible to save power consumption and decease cost of production since the number of the correlators 54 and the data detector 55 can be decreased sharped. Here, since the number of the correlators and data detectors can be decreased, it is possible to simplify the configuration of the receiving apparatus and reduce cost of production. Furthermore, it is possible to prolong the using time of a rechargeable battery for a cellular terminal where the above receiving apparatus is applied since power consumption of corresponding circuitry is decreased accordingly. It is possible to diminish the size of the cellular system since the above receiving apparatus can be minimized as its configuration is simplified.

Meantime, in the embodiment described in FIG. 4, the multiplexer 53 should operate at high speed so as to input the PN codes received from the respective buffers $52_1$ to $52_n$ into the correlators 54 in turn, which makes it difficult to design a transmitting and receiving system.

FIG. 6 is a block diagram showing another configuration of the receiving part of the multi-carrier PC-CDMA system according to the present invention, considering the above mentioned difficulties. In FIG. 6, a plurality of mixers 61 mix receive signals with orthogonal frequencies as same as described in FIG. 3a. Buffers 62 store the PN codes received from the mixers 61 in turn. Multiplexers 63 receive the output, PN codes, from the buffers, here, a predetermined number of buffer 62 is not specified, but determined according to a capacity of transmitting and receiving system. The output data from the multiplexers 63 are inputted into a parallel-to-serial convertor 66, passing through correlators 64 and data detectors 65 in turn. The parallel-to-serial convertor 66 converts the output from the data detectors 65 into serial data, the original data. Here, the respective correlators 64 and data detectors 65 have also the same configuration with the ones in FIG. 4.

In this configuration, a multiplexer 63 receives data stored at a predetermined number of buffers 62, not at all the buffers, as a plurality of buffers 62 are coupled to a multiplexer 63. Therefore, when denoting the number of the multiplexer 63 as n, an operation speed is set to 1/n differently to the multiplexer 53 in FIG. 4. That is, it is possible to apply this embodiment described above to a system that should transmit and receive data at high speed since a plurality of multiplexers 63, correlators 64 and data detectors 65 process the data received from the transmitting apparatus, even though the system becomes more complicated than the one shown in FIG. 4.

As described above, according to the present invention, a multi-carrier PC-CDMA system can decrease the number of PN codes needed sharply and transmit and receive the data at higher speed than a conventional PC-CDMA system.

Furthermore, according to the present invention, it is possible to minimize the system size and decrease cost of production since the number of correlators and data detectors for data restoration in the receiving apparatus can be decreased.

It will be apparent to those skilled in the art that various modifications and variations can be made in a multi-carrier carrier PC-CDMA system of the present invention without deviating from the spirit or scope of the invention. Thus, it is intended that the present invention cover the modifications and variations of this invention provided they come within the scope of the appended claims and their equivalents.

What is claimed is:

1. A multi-carrier PC-CDMA system, having a plurality of mappers for mapping a plurality of data bits into PN codes corresponding to transmitting data values so as to spread the transmitting data values with predetermined PN codes and detecting PN codes from received signals to restore to original data, comprising;

a transmitting part including a plurality of mixers for mixing the respective PN codes outputted from the plurality of mappers with respective frequency signals having orthogonal feature, and a receiving part including a plurality of mixers for mixing received signals with the same frequency signals mixed at the transmitting part and detecting PN codes from the signals outputted from mixers, respective mappers having different configurations from each other so as to generate an intrinsic PN code independently, regardless of PN codes outputted from the other mappers.

2. A multi-carrier PC-CDMA system, having a plurality of mappers for mapping a plurality of data bits into PN codes corresponding to transmitting data values so as to spread the transmitting data values with predetermined PN codes and detecting PN codes from received signals to restore to original data, comprising;

a transmitting part including a plurality of mixers for mixing the respective PN codes outputted from the plurality of mappers with respective frequency signals having orthogonal feature, and a receiving part including a plurality of mixers for mixing received signals with the same frequency signals mixed at the transmitting part and detecting PN codes from the signals outputted from the mixers, respective mappers having the same configuration with each other so as to generate an identical PN code when a data value inputted into each mapper is identical.

3. A multi-carrier PC-CDMA system comprising a transmitting apparatus for mixing a plurality of data bits with PN codes corresponding to transmitting data values, the PN codes have orthogonal feature, and a receiving apparatus for mixing again received data with frequency signals having orthogonal feature and detecting PN codes to restore to original transmitting data values, the receiving apparatus includes a storing means for storing PN codes obtained by mixing the frequency signals, a multiplexer for reading the PN codes, in turn, stored at the storing means, in a unit of the codes, a correlator for outputting level signals corresponding to the PN codes outputted from the multiplexer, and a data detector for detecting transmitting data, based on the level signals outputted from the correlator.

4. A multi-carrier PC-CDMA system comprising a transmitting apparatus for mixing a plurality of data bits with PN codes corresponding to transmitting data values, the PN codes have orthogonal feature, and a receiving apparatus for mixing again received data with frequency signals having orthogonal feature and detecting PN codes to restore to original transmitting data values, the receiving apparatus includes a storing means for storing PN codes obtained by mixing the frequency signals, at least more than one multiplexer, coupled to a predetermined number of the storing means correspondingly, for reading the PN codes, in turn, stored at the storing means, in a unit of the codes, at least more than one correlator, coupled to the respective multiplexers, for outputting level signals corresponding to the PN codes outputted from the corresponding multiplexer, and at least more than one data detector, coupled to the respective correlators, for detecting transmitting data, based on the level signals outputted from the corresponding correlator.

\* \* \* \* \*